United States Patent [19]

Tadokoro et al.

[11] 4,013,098
[45] Mar. 22, 1977

[54] INLET PIPE

[75] Inventors: Tomoo Tadokoro; Masayuki Kawata, both of Hiroshima, Japan

[73] Assignee: Toyo Kogyo Co., Ltd., Japan

[22] Filed: May 19, 1975

[21] Appl. No.: 579,076

[30] Foreign Application Priority Data

May 22, 1974 Japan ........................ 49-59099[U]

[52] U.S. Cl. .................... 138/106; 138/107; 60/303; 285/416
[51] Int. Cl.² .................. F16L 23/00; F01N 3/10
[58] Field of Search ............ 138/38, 106, 107, 109; 60/303; 165/178; 285/405, 416; 248/49

[56] References Cited

UNITED STATES PATENTS

| | | | |
|---|---|---|---|
| 1,848,990 | 3/1932 | Boyd et al. ........................ | 60/303 |
| 1,985,713 | 12/1934 | Bartlett ............................. | 60/303 |
| 3,038,552 | 6/1962 | Hedblom ........................... | 60/303 |
| 3,065,595 | 11/1962 | Gary ................................. | 60/303 |
| 3,168,114 | 2/1965 | Martin .............................. | 138/106 |
| 3,595,015 | 7/1971 | Kretschmer ...................... | 60/303 |
| 3,642,308 | 2/1972 | Zeile, Jr. et al. .................. | 248/49 |

*Primary Examiner*—Richard E. Aegerter
*Assistant Examiner*—Richard R. Stearns
*Attorney, Agent, or Firm*—Wenderoth, Lind & Ponack

[57] ABSTRACT

An inlet pipe for use in a thermal reactor employed in an automotive vehicle engine or the like, which inlet pipe is provided with a flange portion having a plurality of cut-out portions or notches formed at regular intervals on the outer periphery of the flange portion for decreasing the area which conducts heat absorbed by the inlet pipe with a consequent reduction in heat loss of the inlet pipe due to thermal conduction, thus the temperature of the inlet pipe is rapidly raised to and maintained at a high level for efficient combustion of the exhaust gas introduced into the reaction chamber with improved purification efficiency of the thermal reactor.

14 Claims, 10 Drawing Figures

INLET PIPE

This invention relates to an inlet pipe and more particularly, to supporting means for an inlet pipe for use in a thermal reactor, which thermal reactor is employed in an automotive vehicle engine or the like for purification of exhaust gas through re-combustion thereof in the reactor.

Commonly, for the purification of exhaust gas generated by an internal combustion engine, the exhaust gas is led from an exhaust port or an exhaust manifold of the engine into a reaction chamber of a thermal reactor for recombustion therein through an inlet pipe disposed between the exhaust port and the thermal reactor.

Referring to FIG. 1, the conventional inlet pipe I of the above described type generally includes a pipe portion Ia integrally formed or rigidly connected to a flange portion F, which flange F is tightly held between the exhaust port or the exhaust manifold A connected to the exhaust port of an engine and a reactor flange C which is fixed to a peripheral edge of an opening O formed in an outer casing S of the thermal reactor R, for example, through a gasket G for air-tightness therebetween, while the pipe portion Ia of the inlet pipe I extends into the reaction chamber B of the reactor R in coaxially spaced relation to an inner periphery of the reactor flange C, thus the exhaust gas is introduced into the reaction chamber B in a direction shown by an arrow e for re-combustion in the latter. There are cases where the flange portion F of the conventional inlet pipe I of the above described type is directly welded to the surface of the reactor flange C depending on the requirements.

Referring also to FIG. 2, the flange portion F for supporting the conventional inlet pipe I of the above described type, however, has a serious disadvantage. Such a prior art flange portion F has continuous upper and lower surfaces defined by two concentric circles about the axis of the inlet pipe I, and at least the outer portions of the upper and lower surfaces adjacent to the outer periphery of the flange F closely contact the surface of the reactor flange C and also the surface of the gasket G, and the contact area of the flange F is inevitably increased and the heat in the inlet pipe I itself is conducted, to a large extent through the flange portion F, out of the inlet pipe I, i.e., to the reactor flange C and the gasket G as shown by arrows t in FIG. 1, thus making it difficult to raise the temperature of the inlet pipe I or to maintain the pipe I at high temperature level. This consequently undesirably lowers the temperature of the exhaust gas led into the reaction chamber B.

In order to overcome these disadvantages, a method has been proposed to increase the mixture strength of fuel itself for ensuring the re-combustibility of the exhaust gas in the reaction chamber. This countermeasure, however, necessarily increases the fuel expense and is not desirable from an economical viewpoint.

Accordingly, an essential object of the present invention is to provide an inlet pipe in which the supporting flange portion thereof is formed with cut-out portions or slots for decreasing the contact area or heat conducting area of the flange itself, thereby substantially eliminating the disadvantages inherent in the conventional inlet pipes.

Another important object of the present invention is to provide an inlet pipe of the above described type which is simple in construction and low in manufacturing cost.

A further object of the present invention is to provide an inlet pipe of the above described type in which thermal loss thereof is advantageously reduced for ensuring favorable combustibility of the exhaust gas with consequent improvement of the purification efficiency of the thermal reactor.

According to a preferred embodiment of the present invention, a supporting flange portion which is rigidly connected to or integrally formed with one end of an inlet pipe portion is formed, on its outer periphery, with a plurality of equally spaced arcuate cut-out portions or notches to provide the corresponding number of radially outwardly extending small projections between neighboring cut-out portions. These small projections are suitably secured to a reactor flange provided on an outer casing of a thermal reactor and support the inlet pipe portion while the other end of said inlet pipe portion extends into a reaction chamber of the thermal reactor through the reactor flange which is disposed in coaxially spaced relation to the inlet pipe. By this arrangement, the supporting flange of the inlet pipe contacts the surface of the reactor flange only at the projections with the remaining peripheral edge of the supporting flange being spaced away from the reactor flange. Accordingly, heat loss from the inlet pipe due to thermal conduction through the supporting flange portion thereof is remarkably reduced and, consequently, the temperature of the inlet pipe is rapidly raised to and maintained at a predetermined high level by the exhaust gas introduced into the reaction chamber without reduction in temperature. Favorable re-combustibility of the exhaust gas in the reaction chamber is advantageously maintained and improves the purification efficiency of the thermal reactor.

These and other objects and features of the present invention will become apparent from the following description taken in conjunction with the preferred embodiment thereof with reference to the accompanying drawings, in which.

Figure 1:
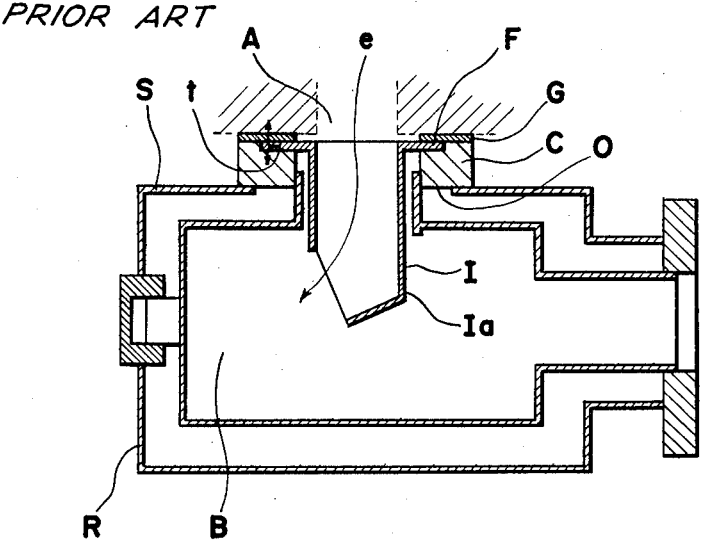
FIG. 1 is a cross-sectional view of a conventional inlet pipe extending into a reaction chamber.
Figure 2:
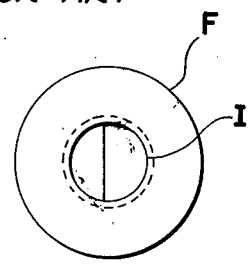
FIG. 2 is a plan view of the flange portion of a conventional inlet pipe.
Figure 3I:
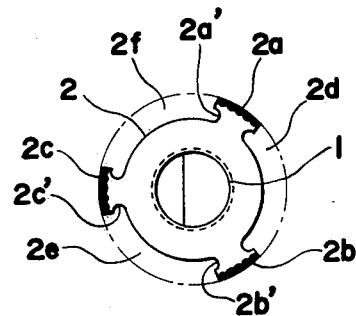
Figure 4I:
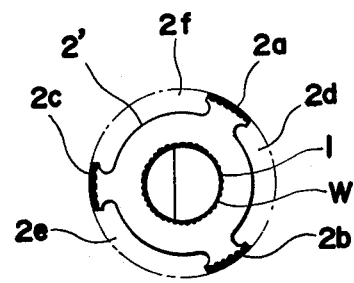
Figure 3:
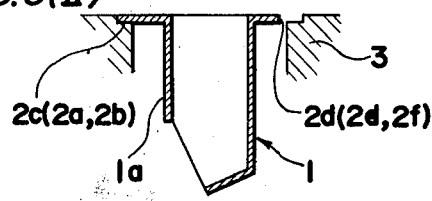
Figure 4:
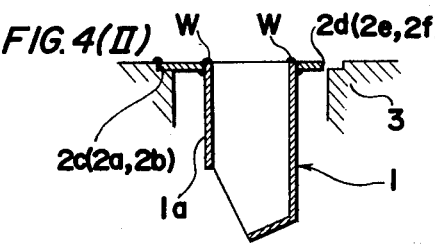
Figure 5I:
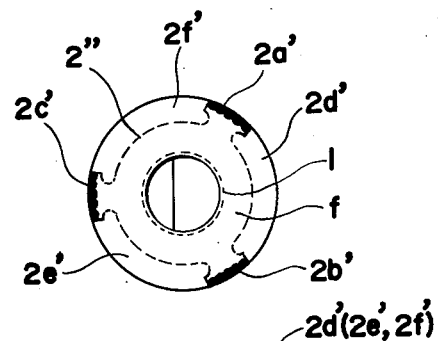
Figure 5:
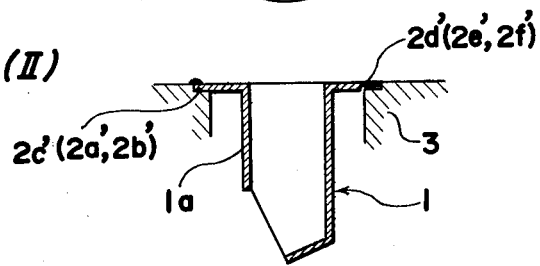
Figure 6I:
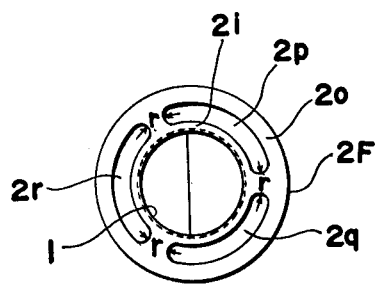
Figure 6:
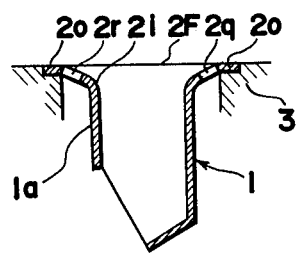

FIGS. 3(I) and 3(II) are a top plan view and a cross sectional side view of an inlet pipe according to an embodiment of the present invention;

FIGS. 4(I) and 4(II) are similar views to FIGS. 3(I) and 3(II) respectively, but particularly show a first modification thereof;

FIGS. 5(I) and 5(II) are similar views to FIGS. 3(I) and 3(II) respectively, but particularly show a second modification thereof; and FIGS. 6(I) and 6(II) are similar views to FIGS. 3(I) and 3(II) respectively, but particularly show a third modification thereof.

Before the description of the present invention proceeds, it is to be noted that like parts are designated by like numerals throughout the several views of the accompanying drawings.

Referring now to FIGS. 3(I) and 3(II), a preferred embodiment of an inlet pipe of the invention is shown in which the inlet pipe 1, a supporting flange portion 2 is integrally connected to an upper edge of an inlet pipe portion 1a on the outer periphery thereof and has a plurality of equally spaced arcuate cut-out portions or notches 2d, 2e and 2f of the same dimension formed so as to provide a corresponding number of radially, outwardly extending small projections 2a, 2b and 2c spaced at regular intervals of 120° to each other about the axis of the flange portion 2. These small projections 2a, 2b and 2c are welded to the surface of a reactor flange 3 provided on an outer casing (not shown) of a thermal reactor (not shown) and support the inlet pipe portion 1a which extends into a reaction chamber (not shown) of the thermal reactor through the reactor flange 3 disposed in coaxially spaced relation to the inlet pipe portion 1a.

It should be noted here that, when the projecting portions 2a, 2b and 2c of the flange 2 are secured, for example, by welding, to the surface of the reactor flange portion 3, the cut-out portions 2d, 2e and 2f are clear of or spaced away from the reactor flange 3 as most clearly seen in FIG. 3(II). Instead of welding the projecting portions 2a, 2b and 2c to the reactor flange 3, surfaces of these portions 2a, 2b and 2c may of course be tightly held, through a gasket or like, between the surface of the reactor flange 3 and an edge of an exhaust manifold of an engine (not shown). In either of the above arrangements, the heat conducting area of the supporting flange 2 is decreased to a large extent due to marked reduction of the contact area of the flange 2 since only the projecting portions 2a, 2b and 2c contact the reactor flange 3. Additionally, if the base portion of each of the projections 2a, 2b and 2c is narrowed by a pair of opposed small notches 2a', 2b' or 2c' formed, to a predetermined depth, at both sides of said base portion, the heat conducting area of the supporting flange 2 is further decreased.

Referring to FIGS. 4(I) and 4(II), a first modification of the inlet pipe 1 of FIGS. 3(I) and 3(II) is shown. In this modification, the supporting flange portion 2' is separately formed and welded to the corresponding upper edge of the inlet pipe portion 1a as at w to form a complete inlet pipe 1. By this arrangement, the manufacturing process of the inlet pipes is simplified to a great extent with an appreciable reduction in cost. Other constructions and functions of the supporting flange portion 2' and the inlet pipe 1a are similar to those of the embodiment of FIGS. 3(I) and 3(II), so that the description thereof is abbreviated.

Reference is now had to FIGS. 5(I) and 5(II) in which a second modification of the inlet pipe 1 of FIGS. 3(I) and 3(II) is shown. In this modification, the portions 2d', 2e' and 2f' equivalent to the cut-out portions 2d, 2e and 2f of the embodiment of FIGS. 3(I) and 3(II) are not cut out, but are not as thick at the lower surfaces thereof as a main portion f and portions 2a', 2b' and 2c', equivalent to the projections 2a, 2b and 2c of the embodiment of FIGS. 3(I) and 3(II), as most clearly seen in FIG. 5(II). This arrangement further decreases the heat conducting area of the flange 2" and is effective for the reduction of heat loss of the inlet pipe 1 due to heat conduction. Since other constructions and functions of the supporting flange portion 2" and the inlet pipe 1a are similar to those of the embodiment of FIGS. 3(I) and 3(II), description thereof is abbreviated.

Referring now to FIGS. 6(I) and 6(II), a third modification of the embodiment of FIGS. 3(I) and 3(II) is shown. In this modification, the supporting flange portion 2F integrally formed with the inlet pipe portion 1a and defined by two concentric circles about the axis of the inlet pipe 1 has three arcuate through-holes or slots 2p, 2q and 2r of the same dimensions formed therein and equally spaced from each other with short regular intervals r kept between the neighboring slots, thus the flange portion 2F are divided into an outer flange portion 2o and an inner flange portion 2i concentrically arranged and connected by the three intervals or intermediate portions r. When the inlet pipe 1 is secured to the reactor flange 3, only the outer flange portion 2o of the flange portion 2F contacts the surface of the reactor flange 3 and the inner flange portion 2i is spaced away from or clear of the reactor flange 3. The result is that the area of the flange portion 2F for conducting the heat of the inlet pipe 1 is limited to the area determined by the intermediate portions r and the thickness of the flange portion 2F.

It should be noted here that the arcuate slots 2p, 2q and 2r need not necessarily be through-holes, but may be of corresponding grooves having predetermined depth from the surface of the flange portion 2F.

It should also be noted that the flange portion 2F described as integrally formed with the inlet pipe portion 1a in the above modification of FIGS. 6(I) and 6(II) may be separately formed as in the second modification of FIGS. 4(I) and 4(II) for subsequent welding to the inlet pipe portion 1a to improve efficiency in manufacturing.

Similarly, the number of arcuate slots or grooves may be increased or decreased within the scope of the present invention, depending upon the requirements.

Other construction and function of the flange portion 2F and the inlet pipe 1a are similar to those in the embodiment of FIGS. 3(I) and 3(II), so that description thereof is abbreviated.

As is clear from the foregoing description, the inlet pipe of the present invention has the supporting flange portion formed with notches or slots therein, thus markedly decreasing the area for conducting heat absorbed by the inlet pipe with a consequent reduction of the heat loss of the inlet pipe due to thermal conduction.

Accordingly, in the inlet pipe of the invention, the temperature of the inlet pipe is rapidly raised to a desired level by the exhaust gas is simultaneously maintained at that high level so that the exhaust gas from the exhaust port of the engine can advantageously be introduced into the reaction chamber of a thermal reactor without lowering the temperature thereof thereby maintaining optimum combustibility of the same and resulting in improved purification efficiency of the thermal reactor.

Furthermore, at inlet pipe of this invention having the construction as described above makes it possible to achieve favorable re-combustion of the exhaust gas in the reaction chamber of the thermal reactor even when the mixture strength of fuel is comparatively low, thereby resulting in reduced fuel expense.

Although the present invention has been fully described by way of examples with references to the attached drawings, it is to be noted that various changes and modifications are apparent to those skilled in the art. For example, the number of cut-out portions or notches formed around the periphery of the flange portion in the embodiment of FIGS. 3(I) and 3(II) is not limited to three, but may be increased or decreased according to the necessity. Therefore, unless such changes and modifications depart from the scope of the present invention they should be construed as included therein.

What is claimed is:

1. In a combination of an inlet pipe connecting an exhaust outlet of an internal combustion engine, said exhaust outlet having a substantially flat, planar surface there surrounding, to an inlet of a thermal reactor which purifies the exhaust gases from said engine by thorough combustion of said exhaust gases therein, said inlet also having a substantially flat, planar surface there surrounding, an improved inlet pipe comprising:

a pipe member extending from said exhaust outlet of said engine into said thermal reactor through said inlet thereto; and support means connected to said pipe member, positioned between and at least partially contacting said surface surrounding said exhaust outlet and said surface surrounding said inlet to said thermal reactor, for supporting said pipe member extended into said thermal reactor, said support means defining a circumferential support area in alignment with corresponding portions of said exhaust outlet surface and said inlet surface; said circumferential support area including a plurality of areas of reduced surface contact with said corresponding surface surrounding said inlet to said thermal reactor, whereby the surface area of said support means contacting said surface surrounding said inlet to said thermal reactor is reduced and the heat conducted from said support means to said exhaust outlet and said thermal reactor is reduced.

2. An improvement as claimed in claim 1, wherein said support means is comprised of:

a flange member connected to said pipe member, extending outwardly radially therefrom, and at least partially contacting said surface surrounding said inlet to said thermal reactor between said exhaust outlet and said thermal reactor, said flange member having a plurality of cut-out sections along the outer edge thereof cut inward toward said pipe member at spaced intervals around the circumference of said flange member and also having a plurality of radially outwardly extending flange projections in the intervals between said cut-out portions.

3. An improvement as claimed in claim 2, wherein the inner edge of said cut-out portions is spaced away from said thermal reactor.

4. An improvement as claimed in claim 2, wherein each flange projection is narrowed at its radially inner end.

5. An improvement as claimed in claim 1, wherein said support means is comprised of:

a flange member connected to said pipe member and extending radially outward therefrom, and at least partially contacting said surface surrounding said inlet to said thermal reactor between said exhaust outlet and said thermal reactor, said flange member having a plurality of areas of reduced thickness along the outer edge thereof and extending inward toward said pipe member at spaced intervals around the circumference of said flange member and also having a plurality of radially outwardly extending flange projections in the intervals between said areas of reduced thickness, said flange projections being of greater thickness than said areas of reduced thickness.

6. An improvement as claimed in claim 5, wherein:

said areas of reduced thickness are positioned at regular intervals at the radially extended circumferential edge of said flange member; and said flange projections contact said surface surrounding said inlet to said thermal reactor.

7. An improvement as claimed in claim 1, wherein said support means is integrally formed with said pipe member.

8. An improvement as claimed in claim 1, wherein said support means is welded to said pipe member.

9. An improvement as claimed in claim 1, wherein said support means is welded to said thermal reactor.

10. In a combination of an inlet pipe connecting an exhaust outlet of an internal combustion engine, said exhaust outlet having a substantially flat, planar surface theresurrounding, to an inlet of a thermal reactor which purifies the exhaust gases from said engine by thorough combustion of said exhaust gases therein, said inlet also having a substantially flat, planar surface theresurrounding, an improved inlet pipe comprising:

a pipe member extending from said exhaust outlet of said engine into said thermal reactor through said inlet thereto; and support means connected to said pipe member, positioned between and contacting said surface surrounding said exhaust outlet and said surface surrounding said inlet to said thermal reactor, for supporting said pipe member extended into said thermal reactor, said support means having a plurality of openings therethrough.

11. An improvement as claimed in claim 10, wherein said support means is comprised of:

a flange member connected to said pipe member, extending radially outward therefrom, and positioned against said surface surrounding said inlet to said thermal reactor, said flange member having a plurality of slots therethrough in said inlet to said thermal reactor and spaced from each other.

12. An improvement as claimed in claim 10, wherein said support means is integrally formed with said pipe member.

13. An improvement as claimed in claim 10, wherein said support means is welded to said pipe member.

14. An improvement as claimed in claim 10, wherein said support means is welded to said thermal reactor.

* * * * *